Patented June 3, 1930

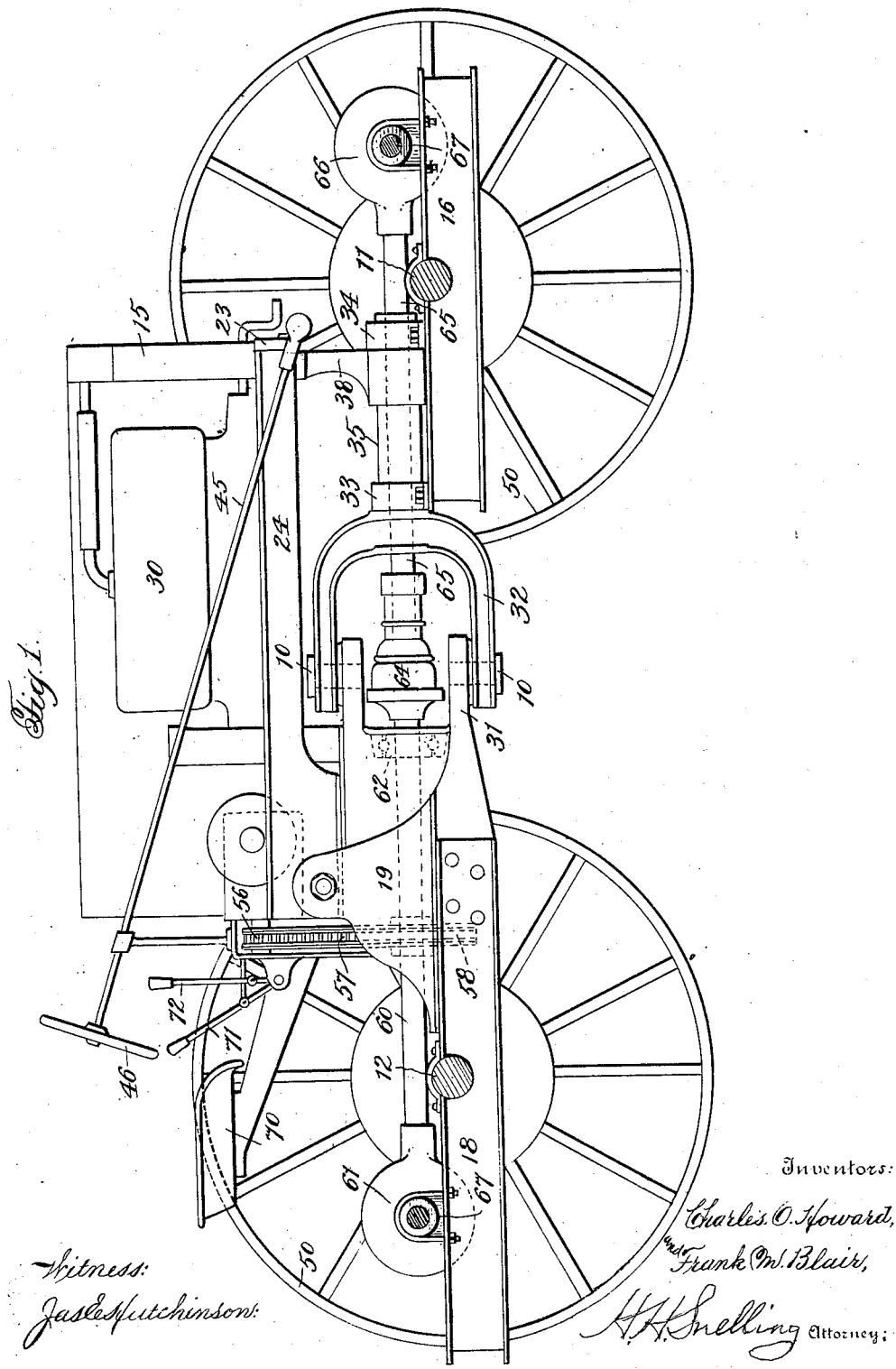

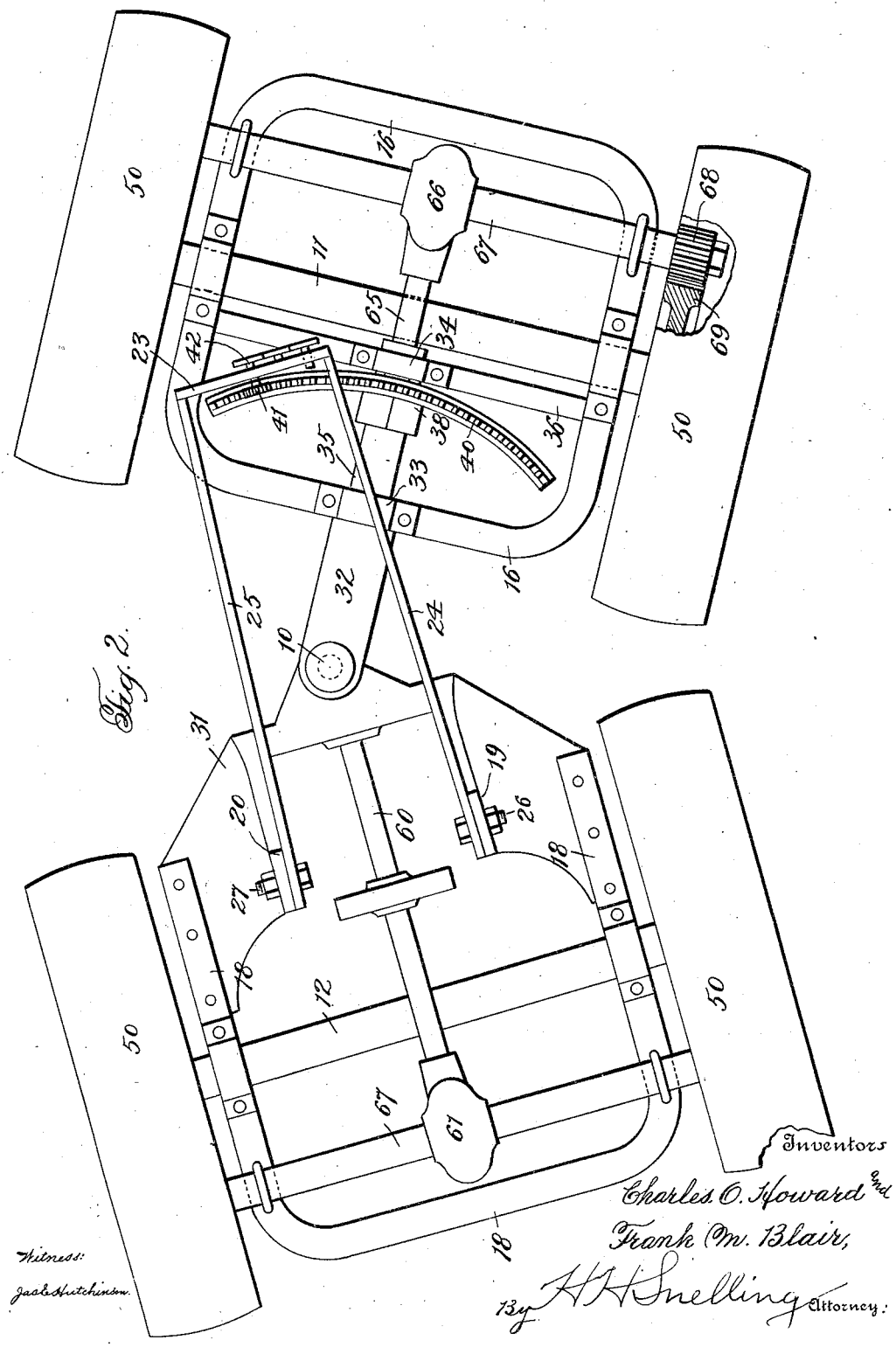

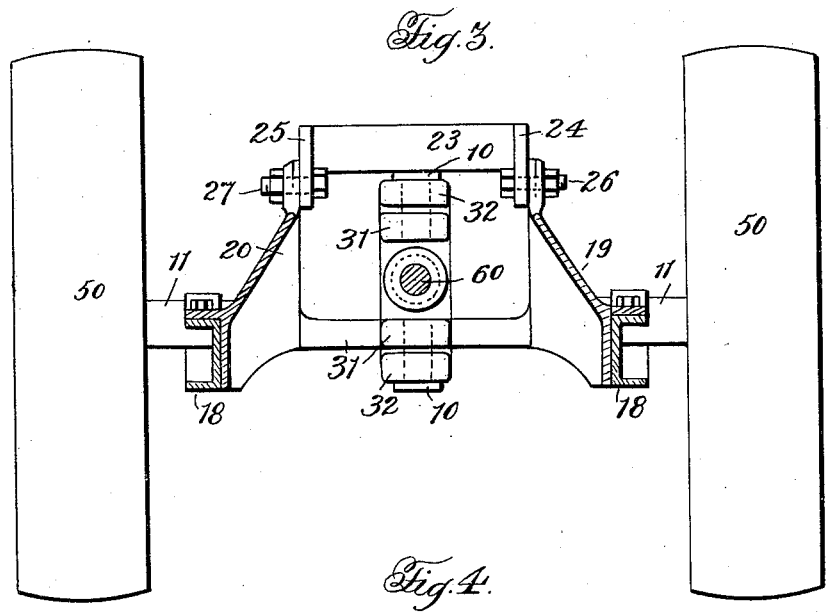

1,761,669

UNITED STATES PATENT OFFICE

CHARLES O. HOWARD, OF COLUMBUS, AND FRANK M. BLAIR, OF NEWARK, OHIO

TRACTOR

Application filed October 26, 1925. Serial No. 64,875.

This invention relates to automobiles and particularly to tractors and has for its object the provision of an efficient device of that nature in which all four of the wheels are used for traction and for steering.

A further object of the invention is the provision of a four wheel drive tractor in which the steering is accomplished by use of a circular rack pivoted to one of the trucks and serving to turn the other truck about the central pivot of the device.

A still further object of the present invention is the provision of a four wheel drive heavy duty tractor in which various parts are simplified and in which means are provided for ready accessibility of the motor and for easy removal thereof and for maintaining adjustment of the various drives throughout all possible positions of the two pivoted trucks.

Other and important objects of the present invention are described in the following specification and are particularly pointed out in the claims, these other objects of the invention relating more particularly to specific details of the tractor.

In the drawings:—

Figure 1 is a side elevation of a truck embodying the present invention.

Figure 2 is a plan view.

Figure 3 is a front elevation with the wheels alined.

Figure 4 is a detail of the rack and pinion for steering.

The tractor illustrated includes two trucks pivoted exactly midway between the front axle 11 and the rear axle 12, these terms "front" and "rear" being convenient for description but actually the device has no front and back and can be operated equally well in either direction. The front, as that term will be used in the following description, refers merely to the portion nearest the radiator 15 which is usually the front end of all tractors.

The front truck frame 16 may be identical with the rear truck frame but we prefer that it be made somewhat smaller being shown here as substantially a hollow square in plan and centrally mounted on the front axle 11.

The rear truck frame 18 is carried substantially centrally of the rear axle 12 and is provided with a pair of standards 19 and 20 on which is pivoted an elongated support or superstructure consisting of a front end piece 23 and two parallel side members 24 and 25 pivoted to the upstanding brackets or standards 19 and 20 by alined pivots 26 and 27 so that the superstructure, which is the sole support of the engine 30 and its necessarily associated parts, may be rotated about its rear end to invert the engine for convenient inspection and repair.

The rear frame 18 has at its front a yoke 31 preferably received within a yoke 32, the former being immovable with respect to the rear truck while the latter is fast to a tube 35 rotatably mounted in bearings 33 and 34, the latter on cross members 36, extending between the two sides of the front frame 16. This construction permits one truck to be moved about a horizontal axis with respect to the other which would occur in practice, for example, when one truck was on a level while one wheel of the other truck was riding over an obstruction.

The tube or hollow shaft 35 carries near its front bearing a bracket 38 supporting a curved rack 40 in mesh with a pinion 41 on a short shaft 42 at the center of the cross piece 23 of the superstructure frame or engine support. This pinion 41 has a chain or any other power connection with a steering rod 45 carrying at its rear end a hand steering wheel 46 of usual design. Movement of the steering wheel 46 causes rotative movement of both the front and rear trucks about their alined vertical pivots 10 so that all four of the wheels 50, preferably alike, take part in the steering as well as in the driving of the tractor.

The engine 30 may be of any desired type but preferably is one having its drive member at the rear, this member here being shown as a sprocket wheel 56 operatively connected by means of a chain 57 with a sprocket 58 fast on the longitudinal power shaft 60, driving at its rear a differential 61. This power shaft passes thru a bearing 62 at the rear end of the yoke 31 and has at its front end a portion of the universal joint 64 which connects the rear shaft 60 with the similar front longitudinal power shaft 65, the latter passing thru the tube 35 and having at its front end the differential 66 transmitting power in the usual fashion to the two drive shafts 67 each carrying a drive pinion 68 in mesh with the gear 69 secured to the ground wheel 50, the rear differential 61 having the same connections.

The operation of the device is as follows: The driver is conveniently positioned in the seat 70 in convenient relation to the steering wheel 46 and the operating levers 71—72. The tractor as stated may be driven just as readily in one direction as in the other, but for convenience of the operator it will usually be driven with the radiator 15 forward. The superstructure or upper frame, it will be noted, carries the entire motive mechanism, including the radiator, engine, and transmission assembly, and since this superstructure is pivoted on the horizontal axis 26—27 parallel to the ground wheel axes, the entire motive mechanism can be inverted for convenient inspection or repair by merely raising the radiator end of the superstructure and swinging it in and arc about its pivot 26—27; the forward connection, that is the connection between the superstructure and the arcuate support 40 being purely a gravity or quick detachable connection so that there is no obstacle to the raising of the forward end of the superstructure.

The steering is accomplished by the turning of the steering wheel 46 which moves both trucks. We much prefer the pinion and rack mechanism to other obvious expedients, as for example, a cable drum to replace the pinion 41, the ends of the cable being secured to the ends of the support 40, the latter naturally being smooth under those circumstances. The support 40 is fast on the hollow member 35 through which passes the front drive shaft 65. The member 35 is fast to the yoke 32, as a result of which the support 40 is always in a plane parallel to the plane of the supporting surface or top of the superstructure frame. In other words, the tubular member 35 is free to oscillate about an axis in or parallel to the center line of the front truck, but the support, since it is fast to the front bracket or yoke 32, always tilts with a tilting of the yokes or the truck pivots, and thus maintains the motive mechanism constantly in position with respect to the rear truck and without any strain other than would occur if the entire tractor were tilted about a central longitudinal line to the same extent.

By having the entire motive mechanism and practically all of the steering mechanism carried on the superstructure, alinement may be had under any conditions the tractor would meet in practice, and the flexibility of the device is at least equal to any known type. In addition it will be noted that but a single universal joint is required for steering and for driving since only the stationary part of the steering mechanism, whether by rack and pinion or by cable, is carried by the front truck.

What I claim is:—

1. In a tractor, a pair of pivoted trucks, a superstructure pivotally carried by one of said trucks and resting on a non-resilient support carried by the other truck characterized by said support having pivotal movement in one truck and being constrained to tilt with the other truck.

2. In a tractor, a pair of pivoted trucks, motive mechanism therefor, a tubular member mounted for axial movement with respect to the front truck and constrained to tilt with the rear truck, a support on the tubular member, said support and said rear truck carrying substantially equal parts of the weight of the motive mechanism.

3. In a tractor, a pair of pivoted trucks, a rack pivoted in the front truck about an axis parallel to the longitudinal center line of said front truck and being secured to the rear truck to tilt therewith, a steering pinion carried by the rear truck and meshing with said rack, and means for driving said steering pinion.

4. In a tractor, a rear truck having a yoke fixedly secured thereto, a front truck having a yoke pivoted thereto about a horizontal axis, a pivotal connection between said yokes, a support secured in fixed relation to the yoke of said front truck, and a superstructure carried by said rear truck and extending forward and resting upon said support.

5. In a tractor, a pair of pivoted trucks, a motor, a frame secured to one of said trucks and carrying said motor, a bracket pivoted on the other of said trucks and supporting said frame in part, and means carried in part by said frame and in part by said other truck for steering the tractor, said means including an arcuate rack on one truck and a pinion on the other truck, said pinion connecting with the means on the said frame.

6. In a tractor, a pair of pivoted trucks, an elongated frame pivoted at one end to one of said trucks for movement vertically relative to the trucks and resting at its other end on the other of said trucks, and motive mechanism supported on said frame, and steering mechanism carried in part by said frame and in part by one of the trucks.

7. In a tractor, two independent trucks each having a pair of ground wheels, driving mechanism for each truck including a differential and a pair of drive shafts, a longitudinal power shaft connected to each differential, a bracket carried by one of said trucks, a hollow member pivoted in the other of said trucks, a bracket secured to said hollow member, a pivot connecting said brackets and thereby pivotally connecting together said trucks, a superstructure secured at one end to one of said trucks and supported at its other end by said hollow member, a motor mounted on said superstructure, power connections between said motor and one of said power shafts, and a universal joint connecting said power shafts, the power shaft distant from the motor connection passing thru said hollow member.

8. In a tractor, a front truck and a rear truck, each having a pair of alined wheels, a bracket carried by each truck a vertical pivot connecting said brackets and thereby pivotally connecting said trucks, a frame carried by the rear truck and extending forwardly past and above said pivot, a supporting member pivoted in the front truck about an axis in substantial alinement with the center line of the truck, means to cause said support to move laterally about its pivot to maintain parallelism between said support and the axis of the rear truck wheels, and means carried by said frame for causing relative movement of the front part of said frame and said support.

9. In a tractor, two independent trucks each having a pair of coaxial driving ground wheels, a yoke secured to the rear truck, a member pivoted in the front truck, a yoke secured to said member, means for pivoting together said yokes, a support secured to said pivoted member, a frame carried in part by said rear truck and in part by said support, and means carried by said frame and by the front truck for steering the tractor.

In testimony whereof we affix our signatures.

CHARLES O. HOWARD.
FRANK M. BLAIR.